US008086544B2

(12) United States Patent
Boss et al.

(10) Patent No.: US 8,086,544 B2
(45) Date of Patent: Dec. 27, 2011

(54) ANALYSIS OF ENERGY-RELATED FACTORS FOR SELECTING COMPUTATIONAL JOB LOCATIONS

(75) Inventors: Gregory J. Boss, American Fork, UT (US); James R. Doran, New Milford, CT (US); Rick A. Hamilton, II, Charlottesville, VA (US); Steven V. Jackson, Yardley, PA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 12/203,345

(22) Filed: Sep. 3, 2008

(65) Prior Publication Data

US 2010/0057641 A1    Mar. 4, 2010

(51) Int. Cl.
G06F 17/00 (2006.01)
G06Q 10/00 (2006.01)
(52) U.S. Cl. ...................... 705/400; 705/7.11
(58) Field of Classification Search .................. 713/320, 713/300, 321, 323, 330, 340; 705/400, 412, 705/37 R, 7.11, 7.12, 7.13, 7.22, 7.23, 7.24, 705/7.25, 7.26, 7.29, 7.31, 7.32, 7.35, 7.36, 705/7.37, 7.38; 709/229, 223–226
See application file for complete search history.

(56) References Cited

U.S. PATENT DOCUMENTS

| 5,958,058 | A * | 9/1999 | Barrus ........................... 713/320 |
| 6,598,029 | B1 | 7/2003 | Johnson et al. |
| 6,631,309 | B2 | 10/2003 | Boies et al. |
| 6,785,592 | B1 | 8/2004 | Smith et al. |
| 7,171,287 | B2 | 1/2007 | Weiss |
| 7,499,890 | B1 * | 3/2009 | Allen ............................. 705/400 |
| 2003/0033179 | A1 * | 2/2003 | Katz et al. ......................... 705/7 |
| 2004/0034584 | A1 * | 2/2004 | Cory et al. ...................... 705/35 |
| 2004/0098142 | A1 | 5/2004 | Warren et al. |
| 2004/0122728 | A1 * | 6/2004 | Keene .............................. 705/10 |
| 2004/0254899 | A1 | 12/2004 | Abe et al. |
| 2005/0165512 | A1 | 7/2005 | Peljto |
| 2009/0228726 | A1 * | 9/2009 | Malik et al. .................... 713/320 |
| 2009/0240964 | A1 * | 9/2009 | Pfeiffer ......................... 713/320 |
| 2009/0276771 | A1 * | 11/2009 | Nickolov et al. ............. 717/177 |

* cited by examiner

*Primary Examiner* — Igor Borissov

(74) *Attorney, Agent, or Firm* — Patrick J. Daugherty; Driggs, Hoog, Daugherty & Del Zoppo Co., LPA

(57) ABSTRACT

The selection of an optimal data center location for running a computational workload is based on multiple energy criteria. The location is chosen based on multivariate and predictive analysis of total direct and indirect energy costs, and other user-defined factors. Among the direct and indirect costs are power costs and cooling costs as well as structural and other details of a given data center. Among the other factors to be considered that can have an impact on present and future costs are weather patterns, data and forecasts, availability of energy providers, and energy attributes. A forecaster factors these direct and indirect costs along with extrinsic information such as historical trends and predictive sources into a forecast which is then input to a decision engine along with user defined criteria and with anticipated compute tasks and requirements to select a final location or locations for handling the workload.

12 Claims, 2 Drawing Sheets

ANALYSIS OF ENERGY-RELATED FACTORS FOR SELECTING COMPUTATIONAL JOB LOCATIONS

FIELD OF THE INVENTION

The invention relates to computer technology associated with the financial aspects of data processing, particularly as it deals with the economic and practical analysis for selecting optimal sites for handling computational workloads based on multiple energy criteria.

BACKGROUND OF THE INVENTION

Currently, computing workloads are processed within a data center. Disaster recovery mechanisms exist to transfer data or processing to an alternate site based on an interrupt such as an outage at the original location.

Grid computing enables the distribution of compute workloads based on available resources. Typically, it does not include methods for determining a geographical or physical location based on real-time or future energy factors.

Information technology (IT) power costs have been steadily increasing, causing some experts to predict that the power costs relating to computer utilization will soon overtake computer hardware costs. Additionally, many of the indirect power related costs, such as equipment cooling, also are causing a significant burden on business IT budgets. Failure to consider all of these factors causes unnecessary disruptions and added expense for businesses.

Accordingly, there exists a need in the art to overcome the deficiencies, limitations and shortcomings of the type described herein above.

SUMMARY OF INVENTION

This invention relates to the selection of an optimal location for running a computational workload, based on multiple energy criteria. A location is chosen based on multivariate and predictive analysis of total direct and indirect energy costs, as well as other user-defined factors. Furthermore, this invention enables a comprehensive analysis, considering more factors than just direct power costs. It covers the creation of data tables with multiple criteria and a decision engine (also referred to as a "rules engine") for selecting an optimal location based on given criteria, allowing the user to assign weightings to the criteria.

This invention discloses a system and method for performing a detailed analysis to determine total energy costs of processing a computational job at multiple given locations. A multivariate analysis is performed to calculate power costs, temperature differentials and other factors. Both real-time (at the time a given job is to be run) and predictive (short term forecasts over the life of the job) factors may be considered. This invention enables flexible addition or modification of multiple energy attributes, decision criteria and analysis/selection methods using a rules engine. In one embodiment, a system for determining a physical location for running a computational workload includes a data collector for collecting multivariable energy-related data from diverse sources; a forecasting module for receiving the collected energy-related data and other criteria affecting overall computing costs, for predicting projected energy consumption based on the collected data, and generating an output; and a rules engine to compare the output of the forecasting module with predefined criteria, and to select a location based on energy costs and other criteria. In another embodiment, a method for determining a physical location for running a computational workload includes: collecting multivariable energy-related data from diverse sources; predicting projected energy consumption based on the collected data and on other criteria affecting overall costs; comparing an output of a forecasting module with predefined criteria; and selecting a location based on the energy costs and other cost-effecting criteria.

The invention further includes a computer product that uses a computer-readable program. The program contains instructions to be implemented on a computer to determine a location for running a given computational workload. The instructions enable a multivariate analysis to be performed to calculate power costs, temperature differentials and other factors. Both real-time and predictive factors may also be considered. A decision engine is instructed to execute an analysis/selection to select a preferred location to carry out the compute workload. In one embodiment a computer-readable medium contains instructions, which when implemented on a computer, determine a physical location for running a computational workload by collecting multivariable energy-related data from diverse sources; predicting projected energy consumption based on the collected data and on other criteria affecting overall costs; comparing the output of a forecasting module with predefined criteria; and selecting a location based on the energy costs and other cost-effecting criteria. In another embodiment a computer product includes a medium on which a computer program is recorded, the computer program including: a first set of instructions for collecting multivariable energy-related data from diverse sources; a second set of instructions for predicting projected energy consumption based upon receipt of the collected data; a third set of instructions for a decision engine to compare the output of the forecasting module with predefined criteria, and to select a location based on energy costs and other criteria; and program logic for initiating said sets of instructions to make a determination regarding the selection of a location. Known decision methods may be used to evaluate the criteria. One example of a possible decision method may include providing weightings to each of the criteria, then summing them for a final score. The location with the highest score is determined to be the optimal location.

The invention also relates to a method for deploying an application for selecting a physical location for running a compute workload. The method comprises collecting multivariable energy-related data from diverse source. Projected energy consumption is predicted based on the collected data and on other criteria affecting overall cost. The output of a forecasting module is compared with predefined criteria. A location is selected based on the energy costs and other cost-effecting criteria. In one embodiment a method for deploying an application for selecting a physical location for running a compute workload includes: collecting multivariable energy-related data from diverse sources; predicting projected energy consumption based on the collected data and on other criteria affecting overall costs; comparing an output of a forecasting module with predefined criteria; and selecting a location based on the energy costs and other cost-effecting criteria.

BRIEF DESCRIPTION OF THE DRAWING

These and other features of this invention will be more readily understood from the following detailed description of the various aspects of the invention taken in conjunction with the accompanying drawings in which.

It should be understood that the drawings are intended to be merely schematic representations of the invention and its environment. They are not necessarily drawn to scale, nor are they intended to portray specific parameters of the invention. The drawings are intended to depict only typical embodiments of the invention, and therefore should not be considered as limiting the scope of the invention. In the text, repetition of a number is used to represent the same element.

DETAILED DESCRIPTION OF THE INVENTION

In one embodiment, the present invention utilizes a rules engine to select a location and energy provider for running a computational job. Primarily, energy related criteria will be used although, optionally, non-energy criteria may be added as well. The following energy-related criteria may be considered, both for real-time values and short-term forecasts.

- Environmental conditions (temperature, humidity)
- Direct energy costs
- Air conditioning costs
- Third party "Data Center Efficiency Rating"
- Data center cooling methods and insulation
- Energy provider name
- Geographic source
- Methods used to generate energy (e.g. renewable sources, coal)
- Maximum amount of energy available
- Duration of time a rate is available Optionally, users may also include non-power criteria, both for real-time values and short-term forecasts. Among these are the following:

- Speed of processing
- Data center charges
- Risks (e.g. pending storms or pending employee strikes)
- Current labor rates
- Processing overhead for dispatching, moving and managing jobs.

Figure 1:
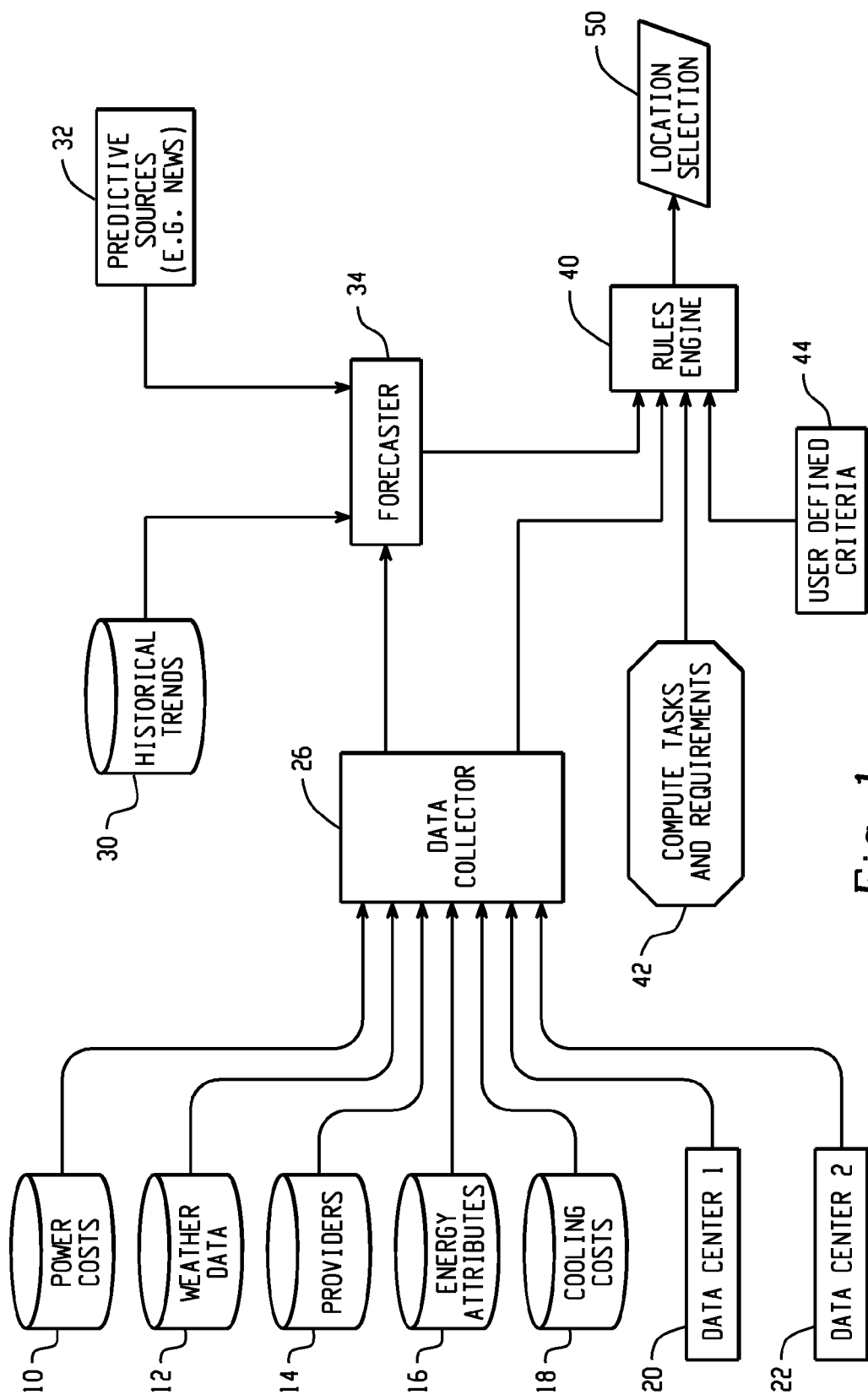
FIG. 1 is a block diagram showing system inputs and outputs.

Turning now to the drawings, FIG. 1 is a diagram showing the operative steps according to the present invention for selecting one or more locations for conducting a computational workload. A data collector 26 receives inputs from a variety of different sources. These include power costs 10, weather data 12, a list of available energy providers 14, various energy attributes 16, and cooling costs 18. This data is compiled from different sources such as data center #1 (20) and data center #2 (22).

The data accumulated from the data collector 26 is forwarded to a forecaster 34 which also assimilates historical trends 30 and information from various predictive sources 32 such as news releases, almanacs and the like. The assimilated information is then forwarded to a rules engine 40 which separately receives information from the data collector 26 as well as from a source 42 which contains the specifications and information on the tasks and requirements of the compute workload, and from a list of the criteria 44 as defined by the user. The rules engine then makes the determination as to the location selection 50.

This invention includes consideration of short-term forecasts. It is expected that the term of prediction will span only the life of the compute job. Likely, this will be measured in days or hours, but does not rule out longer periods. FIG. 1 shows an example embodiment using a forecaster 34 to collect real-time, historical and other input data to calculate forecasts. Input may come from a number of sources, including a news report of a pending strike in a location being considered.

Any known or future modeling process may be used for creating predictions. This may include simulation techniques such as Monte Carlo Analysis which randomly generates values for uncertain variables to simulate a model.

Optionally, at the time a job is run, actual costs for each option may be calculated and compared with predictions, to judge the effectiveness of the predictions. This information may be used to modify and improve prediction methods that are used, or as a feedback loop to provide additional input data.

Given the financial and environmental importance of managing energy usage, third party industry organizations are creating different data center efficiency ratings. One example of such rating is the Environmental Protection Agency (EPA) "Energy Star" rating.

This invention may include any known or future rating as input criteria. Many factors other than power and cooling contribute to how "efficient" a given data center is at processing jobs, and may be included in various ratings. Telecom rates, labor costs, equipment and space rental rates, and real estate prices are just few additional factors. One method for calculating the efficiency rating may be to divide the total cost of running the data center by the average anticipated amount of computer processing. The processing may be calculated by summing weighted factors including mainframe MIPS (Millions of Instructions per Minute), transactions processed per second, or Terabytes (TB) of storage used, to name a few.

Additionally, one data center may have older equipment that is slower and consumes more power, but have a large amount of equipment or space available. Another may have new but only a limited supply of equipment. The total "cost" of running a particular compute job at each site or within a particular compute environment may be calculated using customized weighted values.

Consumers are demanding more information and choices about the source of their energy. Some select energy based on environmental considerations and the use of renewable sources. This invention enables these considerations to be included in the selection of a preferred location.

Sample Data Tables

Tables 1 and 2 below illustrate sample data tables that may be used in the decision for selection between data centers in, for instance, Washington state, Denver, Colo. and San Jose, Calif.

TABLE 1

Energy Provider Data

| Provider | Source | Cost ($/unit) | Locations Available | Amount Available (Units/hour) |
|---|---|---|---|---|
| Provider A | Renewable (wind) | $10 | California | 3,000 |
| Provider A | Non-renewable (coal) | $6 | California, Washington | 6,000 |
| Provider B | (wind, solar) | $8 | Colorado | 4,000 |
| Provider B | (coal) | $5 | Colorado | 8,000 |
| Provider C | (coal) | $6 | Colorado | 5,000 |

TABLE 2

Data Center Attributes

| Data Center | Current Temp (deg F.) | Forecast Tomorrow Temp | Cost of cooling ($/unit) | Max Transactions/sec | Network latency | Compute efficiency rating | Processing Overhead |
|---|---|---|---|---|---|---|---|
| Denver | 42 deg | 53 deg | $4 | 4,000 | 80 ms | 2.3 | 2% |
| San Jose | 78 deg | 89 deg | $7 | 2,800 | 45 ms | 4.5 | 13% |

Computer Implementation of the Invention

Figure 2:
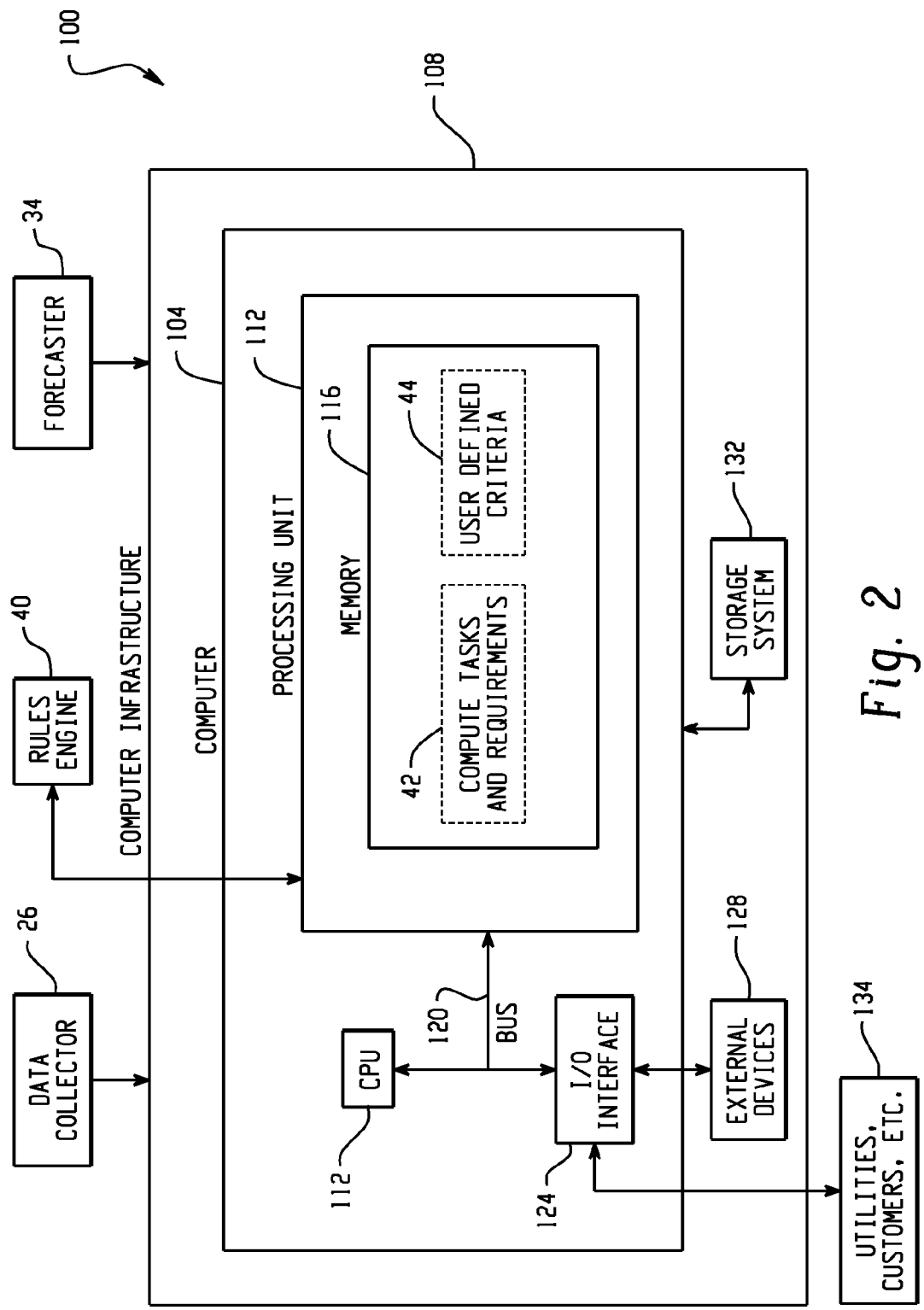
FIG. 2 illustrates an exemplary computerized implementation of the collection, processing and implementation of the present invention.

Referring now to FIG. 2, an exemplary computerized system 100 for implementation of the present invention includes a computer 104 deployed within a computer infrastructure 108 such as that existing with user interface described above. This is intended to demonstrate, among other things, that the present invention could be implemented within a network environment (e.g., the Internet, a wide area network (WAN), a local area network (LAN), a virtual private network (VPN), etc.), or on a stand-alone computer. The infrastructure 108 can have a communication link via a bus 120 which in turn communicates through an I/O interface 124 to one or more outside contacts 134 such as utilities or customers.

In the case of a network, communication throughout the network can occur via any combination of various types of communications links. For example, the communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, computer infrastructure 108 is intended to demonstrate that some or all of the components of the implementation could be deployed, managed, serviced, etc. by a service provider who offers to implement, deploy, and/or perform the functions of the present invention for others.

As shown, the computer 104 includes a processing unit (CPU) 112, a memory 116, a bus 120, between an input/output (I/O) interface 124 and the CPU 112. The processing unit 112 receives information from the data collector 26, the forecaster 34 and sends the data to the rules engine 40. Further, the computer 104 is shown in communication with external I/O devices/resources 128 and storage system 132. In general, the processing unit 112 executes computer program code, such as the code to implement the collection of data, which is stored in memory 116 and/or storage system 122 of the data collector 26. Additional codes are use by the forecaster to assimilate the data from the data collector 26, historical trends 30 and predictive sources 32. It is to be appreciated that two or more, including all, of these components may be implemented in a single unit.

While executing computer program code, the processing unit 112 can read and/or write data to/from the memory 116, the storage system 122, and/or the I/O interfaces 124. The bus 120 provides a communication link between each of the components in the computer 104. The external devices 128 can comprise any devices (e.g., keyboard, pointing device, display, etc.) that enable a user to interact with computer 104 and/or any devices (e.g., network card, modem, etc.) that enable the computer to communicate with one or more other computing devices.

The computer infrastructure 108 is only illustrative of various types of computer infrastructures for implementing the invention. For example, in one embodiment, computer infrastructure 108 comprises two or more computing devices (e.g., a server cluster) that communicate over a network to perform the various process steps of the invention. Moreover, computer 104 is only representative of various possible computers that can include numerous combinations of hardware.

To this extent, in other embodiments, computer 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 112 may comprise a single processing unit, or be distributed across one or more processing units in one or more locations, e.g., on a client and server. Similarly, the memory 116 and/or the storage system 122 can comprise any combination of various types of data storage and/or transmission media that reside at one or more physical locations.

Further, I/O interfaces 124 can comprise any system for exchanging information with one or more of the external device 128. Still further, it is understood that one or more additional components (e.g., system software, math co-processing unit, etc.) not shown in FIG. 2 can be included in computer 104. However, if computer 104 comprises a handheld device or the like, it is understood that one or more of the external devices 128 (e.g., a display) and/or the storage system 122 could be contained within computer 104, not externally as shown.

The storage system 122 can be any type of system (e.g., a database) capable of providing storage for information under the present invention. To this extent, the storage system 122 could include one or more storage devices, such as a magnetic disk drive or an optical disk drive. In another embodiment, the storage system 122 includes data distributed across, for example, a local area network (LAN), wide area network (WAN) or a storage area network (SAN) (not shown). In addition, although not shown, additional components, such as cache memory, communication systems, system software, etc., may be incorporated into computer 104.

While shown and described herein as a method and system for managing computational workloads based on energy criteria, it is understood that the invention further provides various alternative embodiments. For example, in one embodiment, the invention provides a computer-readable/useable medium that includes computer program code to enable a computer infrastructure to manage the data collector 26, forecaster 34 and location selection 50 by the rules engine 40 for simultaneously selecting sites for multiple computational workloads. To this extent, the computer-readable/useable medium includes program code that implements each of the various process steps of each computation.

It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 116 and/or the storage system 122 (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider can offer to manage the user's interface with the information sources In this case, the service provider creates, maintains, supports, etc., a computer infrastructure, that performs the process steps of the invention for one or more customers. In return, the service provider typically receives payment from the customer(s) under a subscription and/or fee agreement.

In still another embodiment, the invention provides a computer-implemented method for executing the program shown in FIG. 1. In this case, a computer system, such as the computer infrastructure 108 shown in FIG. 2, can be provided, and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer 104 from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A system, comprising:
  a processing unit, computer readable memory and a computer readable storage medium;
  first program instructions to collect energy-related data from each of a plurality of different data center sources, the energy-related data comprising power costs, weather data, energy attributes, and cooling costs for each of the plurality of different data center sources;
  second program instructions to predict projected energy consumption forecasts for processing a compute job at each of the different data center sources as a function of a workload requirement of the compute job and the collected energy-related data, wherein the predicted projected energy consumption forecasts are short-term forecasts having a term of prediction spanning only a life of the compute job;
  third program instructions to select a data center source location for performing the compute job from the plurality of different data center sources as a function of the predicted projected energy consumption forecasts, feedback data indicative of effectiveness of the predicted projected energy consumption forecasts, and user-defined criteria; and
  fourth program instructions to calculate actual costs for the selected data center source at a time that the compute job is run, and to provide additional input data to the feedback data indicative of the effectiveness of the predicted projected energy consumption forecasts by comparing the calculated actual costs to the predicted projected energy consumption forecast for the selected data center source;
  wherein the first, second, third and fourth program instructions are stored on the computer readable storage medium for execution by the processing unit via the computer readable memory.

2. The system according to claim 1 wherein the second program instructions are further to predict the projected energy consumption forecasts by simulating a model using a Monte Carlo analysis to randomly generate values for uncertain variables.

3. The system according to claim 1 wherein the second program instructions are further to predict the projected energy consumption forecasts for processing the computational job as a function of a news report of a pending strike in a location of the data center sources.

4. The system according to claim 3 wherein the energy-related data further comprises computer processing speed, data center charges, environmental and business risks, labor rates, age of equipment, supply availability and processing overhead data for each of the plurality of different data center sources; and
  wherein the user-defined criteria comprises a third party data center efficiency rating criteria, a method used to generate energy criteria and a speed of processing criteria.

5. A method for determining a physical location for running a computational workload comprising:
  collecting energy-related data from each of a plurality of different data center sources, the collected energy-related data comprising power costs, weather data, energy attributes, and cooling costs for each of the plurality of different data center sources;
  predicting by a processing unit a projected energy consumption forecasts for processing a compute job at each of the different data center sources as a function of a workload requirement of the compute job and the collected energy-related data, wherein the predicted projected energy consumption forecasts are short-term forecasts having a term of prediction spanning only a life of the compute job;
  selecting by the processing unit a data center source location for performing the compute job from the plurality of different data center sources as a function of the predicted projected energy consumption forecasts, feedback data indicative of effectiveness of the predicted projected energy consumption forecasts, and user-defined criteria; and the processing unit calculating actual costs for the selected data center source at a time that the compute job is run, and providing additional input data to the feedback data indicative of the effectiveness of the predicted projected energy consumption forecasts by comparing the calculated actual costs to the predicted projected energy consumption forecast for the selected data center source.

6. The method according to claim 5 further comprising:
predicting by the processing unit the projected energy consumption forecast by simulating a model using a Monte Carlo analysis to randomly generate values for uncertain variables.

7. The method according to claim 5 wherein the processing unit predicts the projected energy consumption forecasts for processing the computational job as a function of a news report of a pending strike in a location of the data center sources.

8. The method according to claim 7 wherein the energy-related data further comprises computer processing speed, data center charges, environmental and business risks, labor rates, age of equipment, supply availability and processing overhead data of the plurality of different data center sources; and
wherein the user-defined criteria comprises a third party data center efficiency rating criteria, a method used to generate energy criteria and a speed of processing criteria.

9. An article of manufacture, comprising:
a computer-readable storage device having computer readable program code embodied therewith, the computer readable program code containing program instructions that, when implemented on a computer processing unit, cause the computer processing unit to:
collect energy-related data from each of a plurality of different data center sources, the collected energy-related data comprising power costs, weather data, energy attributes, and cooling costs for each of the plurality of different data center sources;
predict projected energy consumption forecasts for each of the data center sources as a function of a workload requirement of the compute job and the collected energy-related data, wherein the predicted projected energy consumption forecasts are short-term forecasts having a term of prediction spanning only a life of the compute job;
select a data center source location for performing the compute job from the plurality of different data center sources as a function of the predicted projected energy consumption forecasts, feedback data indicative of effectiveness of the predicted projected energy consumption forecasts, and user-defined criteria; and
calculate actual costs for the selected data center source at a time that the compute job is run, and provide additional input data to the feedback data indicative of the effectiveness of the predicted projected energy consumption forecasts by comparing the calculated actual costs to the predicted projected energy consumption forecast for the selected data center source.

10. The article of manufacture according to claim 9 wherein the program instructions are further to cause the computer processing unit to predict the projected energy consumption forecasts by simulating a model using a Monte Carlo analysis to randomly generate values for uncertain variables.

11. The article of manufacture according to claim 9 wherein the program instructions are further to predict the projected energy consumption forecasts for processing the computational job as a function of a news report of a pending strike in a location of the data center sources.

12. The article of manufacture according to claim 11 wherein the energy-related data further comprises computer processing speed, data center charges, environmental and business risks, labor rates, age of equipment, supply availability and processing overhead data for each of the plurality of different data center sources; and
wherein the user-defined criteria comprises a third party data center efficiency rating criteria, a method used to generate energy criteria and a speed of processing criteria.

* * * * *